Jan. 16, 1940.     E. THYS     2,187,526
HOP PICKING MACHINE
Filed June 30, 1937     5 Sheets-Sheet 1
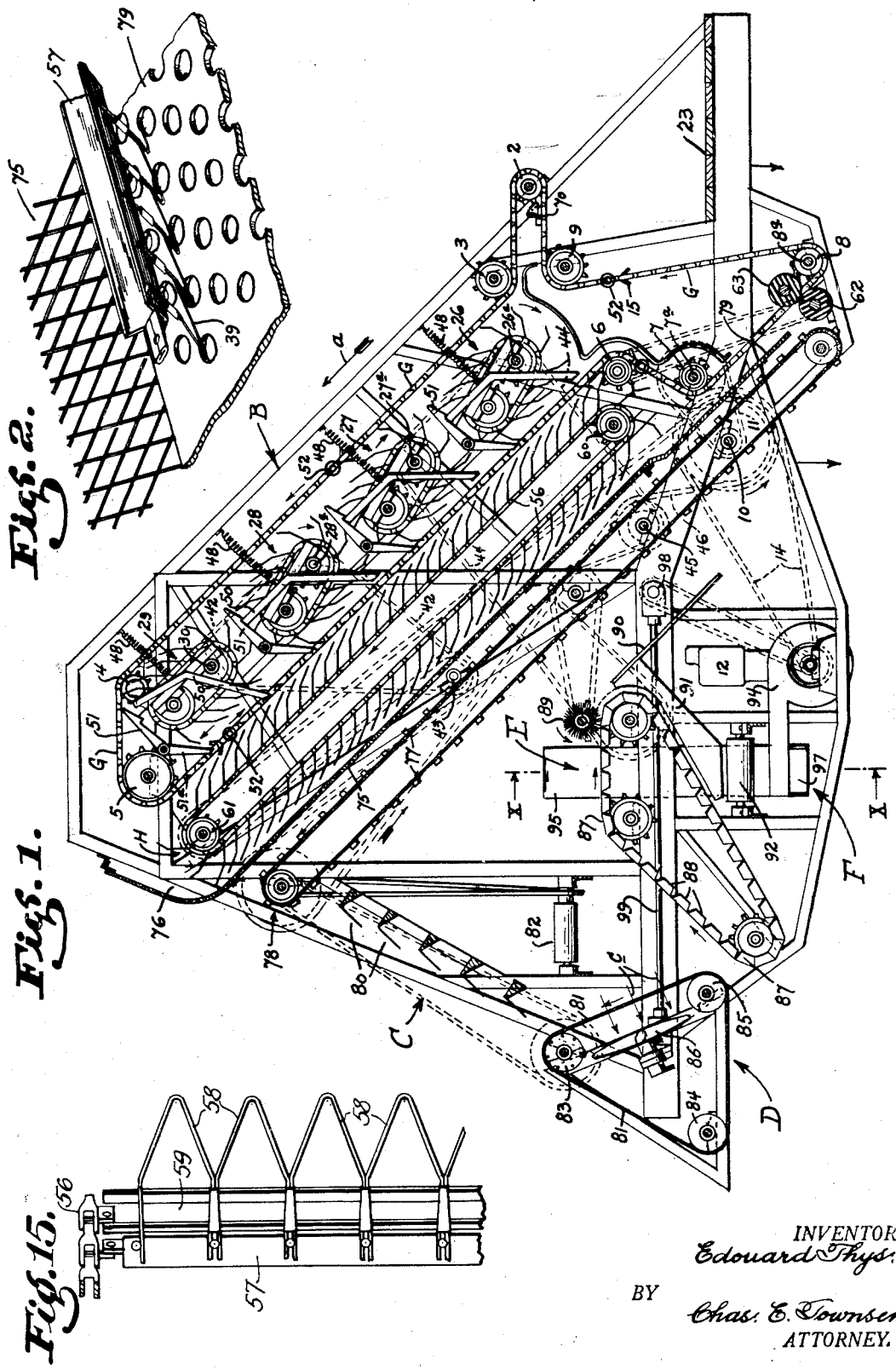
INVENTOR.
Edouard Thys.
BY Chas. E. Townsend.
ATTORNEY.

Jan. 16, 1940.                E. THYS                    2,187,526
                         HOP PICKING MACHINE
                        Filed June 30, 1937           5 Sheets-Sheet 2

INVENTOR.
Edouard Thys.
BY
Chas. E. Townsend.
ATTORNEY.

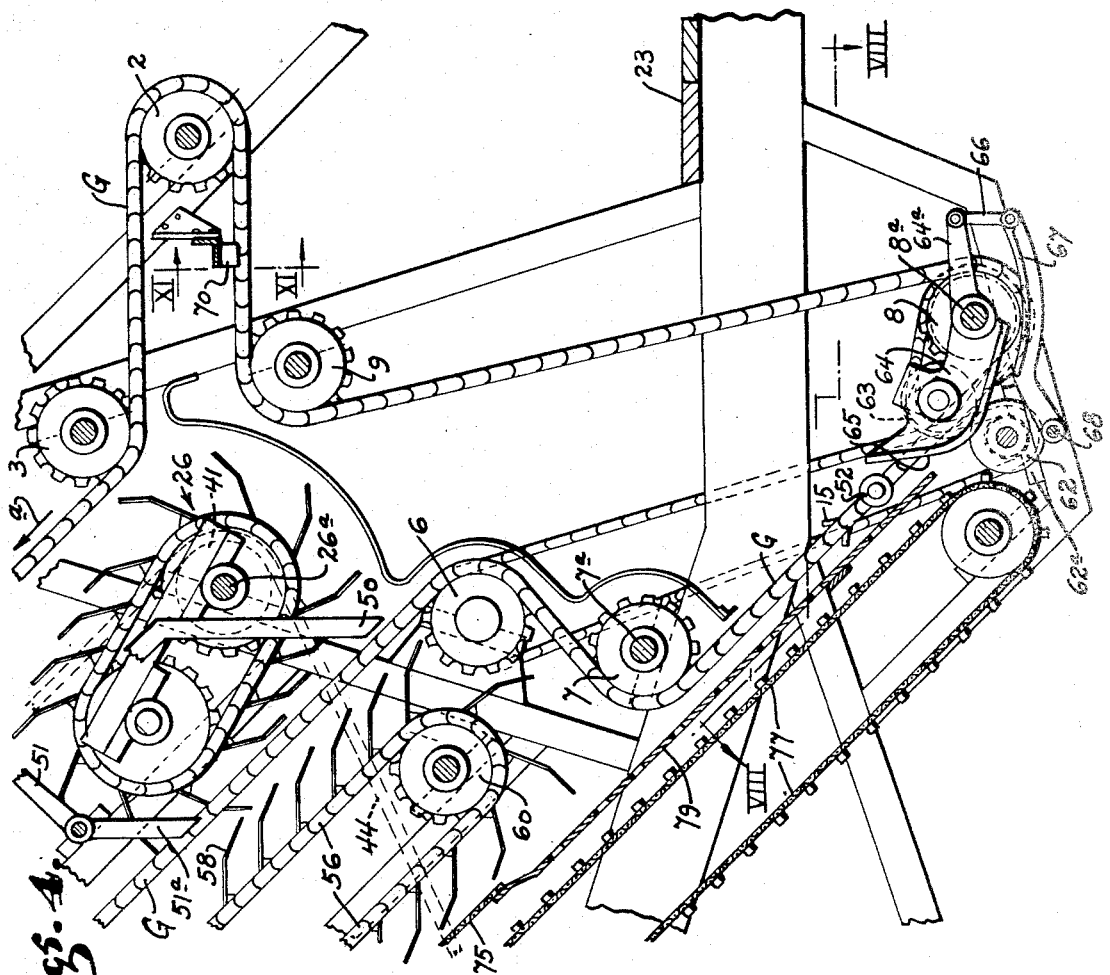
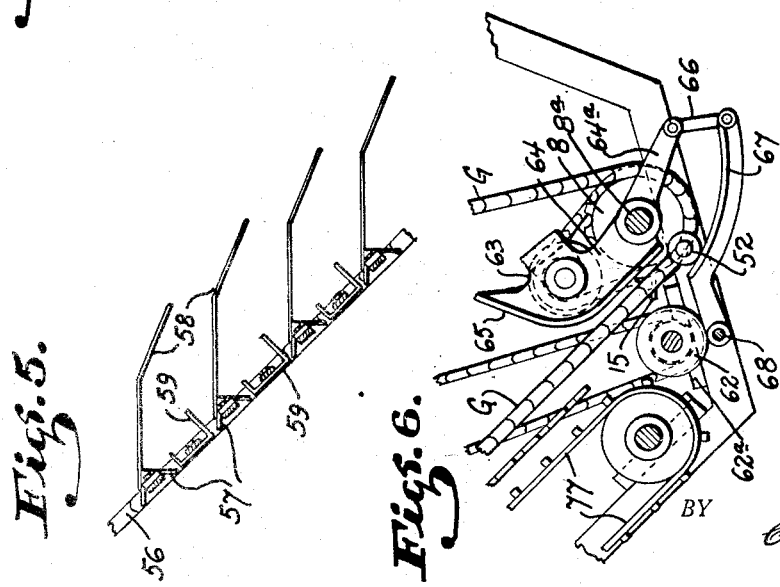

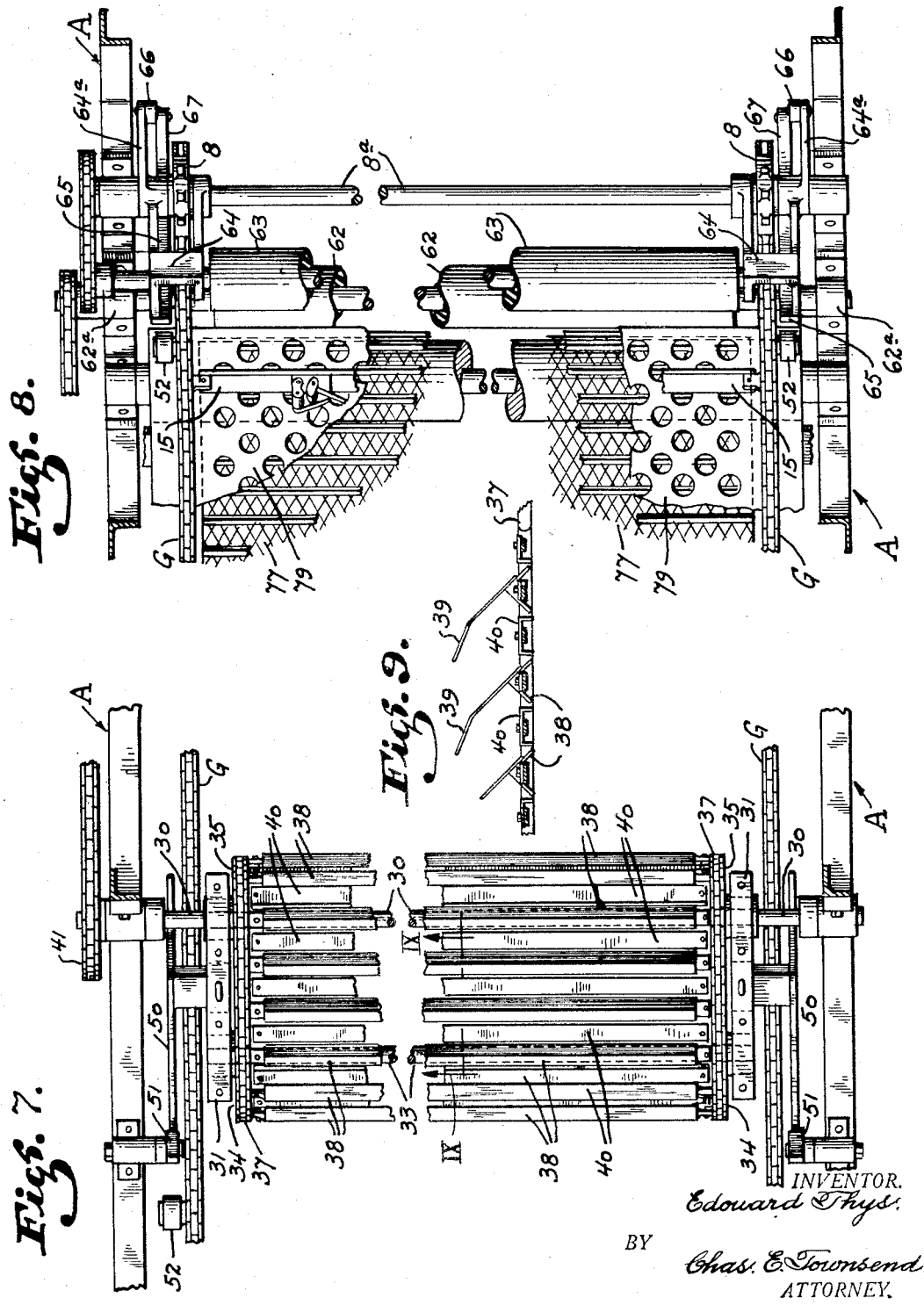

Jan. 16, 1940.  E. THYS  2,187,526
HOP PICKING MACHINE
Filed June 30, 1937   5 Sheets-Sheet 5
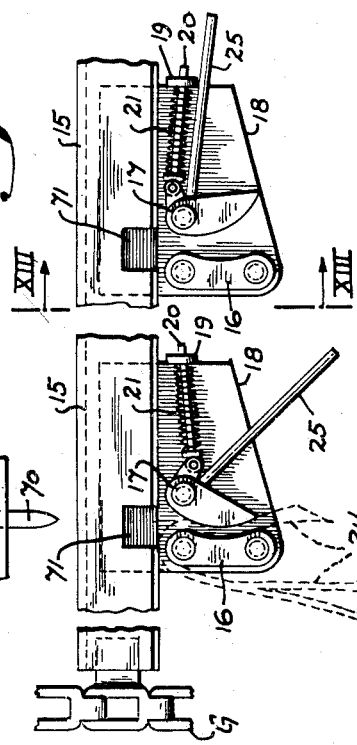
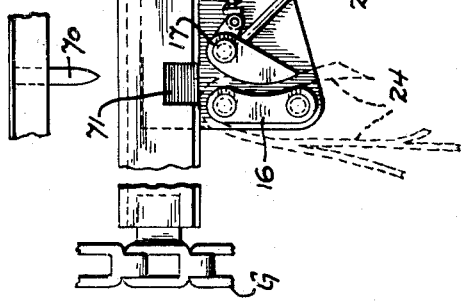
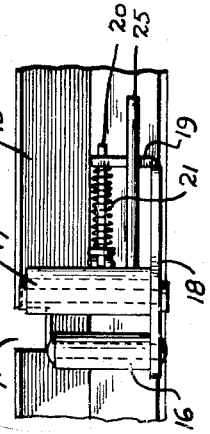
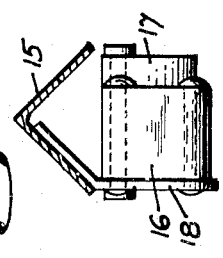
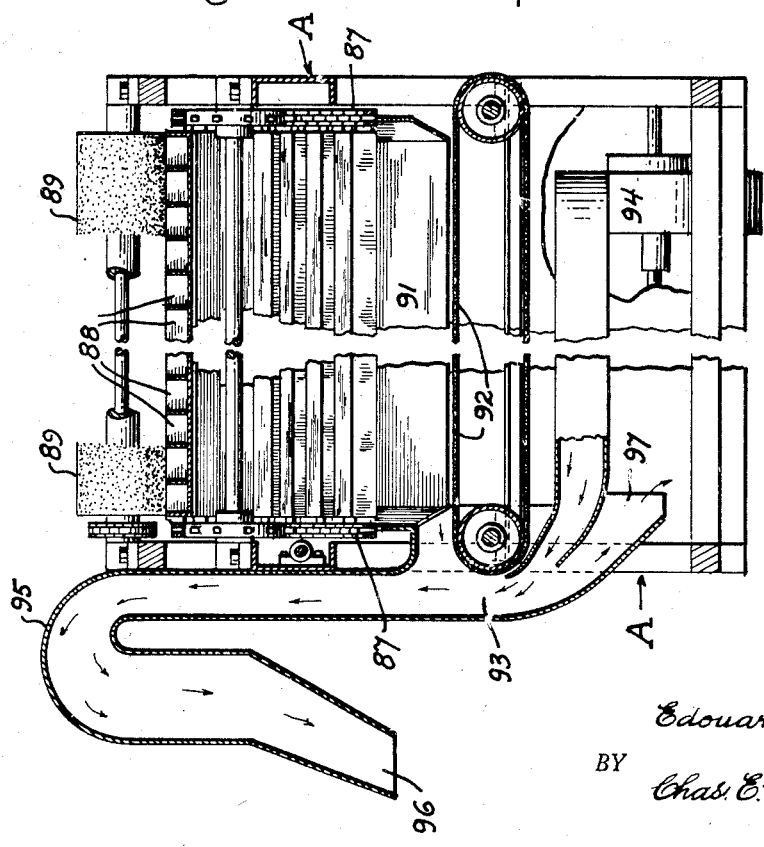
INVENTOR.
Edouard Thys.
BY
Chas. E. Townsend
ATTORNEYS.

Patented Jan. 16, 1940

2,187,526

UNITED STATES PATENT OFFICE 2,187,526

HOP PICKING MACHINE

Edouard Thys, San Francisco, Calif., assignor to E. Clemens Horst Company, San Francisco, Calif., a corporation of New Jersey Application June 30, 1937, Serial No. 151,142

4 Claims. (Cl. 130—30)

This invention relates to hop picking machines and particularly to a portable machine to permit the picking of hops in the fields where they are grown.

The picking of hops by means of machinery is now a comparatively old art, as machine picking has been in continuous use on a comparatively large scale in California and other states at least since 1910, or earlier; the type of machine employed being that illustrated in Patents Numbers 1,054,119 and 1,054,551. These machines are large affairs, the main picking machine being about two hundred feet long, thirty feet high, and about twenty-five feet wide. Besides the main picking machine there are machines for separating the stems and leaves from the hops and there are arm pickers and cluster busters. The several machines are connected by conveyors and form a combined unit all assembled under one roof and known as the picking plant.

Hops, as is well known, grow on vines supported by trellises twelve to eighteen feet high and before they can be picked by machines of the character above referred to, it is necessary to cut down the vines and pull them free from the trellises and to load them onto wagons whereby they are hauled to the main picking plant. They are there unloaded and fed into the picking machine, and the hops removed are separated from leaves and stems and are finally delivered to the hop kilns to be dried.

While this method of handling and picking is more efficient and less costly than hand picking, there is, nevertheless, considerable waste, breakage of vines, and loss of time; the main loss in time being that of hauling the vines from the fields to the main picking plant, the breakage encountered in loading and unloading the vines, and the re-hauling of all waste material back to the fields, etc.

Machine picking directly in the field would eliminate these losses and is the purpose of the present invention. For some time experimental work has been carried on with field picking machines and during the last season or so the results obtained have become so successful that plant picking may be abandoned. The field machine forming the subject matter of this patent is portable and may be hauled by tractor or placed directly upon a truck or trailer. The machine travels through the field between the rows of trellises and will remain stationary while the vines are being cut down and fed into the machine. After a certain area has been cleared off, the machine will be moved ahead, and so on, until the row is finished, after which, row after row will be handled in the same manner, or alternatively, the vines may be fed to the machine while it is traveling between the rows of vines at a slow speed. The machine contains a main feeding and picking unit and separating and cleaning units. The picked and cleaned hops are sacked and hauled to the dry kilns, while all waste material, such as the picked vines, leaves, stems, etc., is left in the field as the machine advances.

The portable machine intended for field picking of hops is shown by way of illustration in the accompanying drawings, in which Fig. 1 is a side elevation of the machine, partially in section;

Fig. 2 is a perspective view showing a portion of the lower end of the diamond-mesh wire screen disposed below the main picking belt, said view also showing a portion of the perforated plate forming an extension of the diamond-mesh screen, and said view also showing a portion of one of the bars whereby the picking fingers are supported;

Fig. 4 is a similar view of the lower portion of the picking mechanism;

Fig. 5 is an enlarged longitudinal section of the main picker belt;

Fig. 6 is a partial side elevation showing the vine-discharging rolls in raised position, said view also showing the cam shoes whereby one of said rollers is actuated;

Fig. 7 is a plan view, partially broken away, of one of the grilling belts;

Fig. 8 is a plan view of the lower end of the picking mechanism, said view being partially broken away;

Fig. 9 is a section taken on the line IX—IX of Fig. 7;

Fig. 10 is a cross section taken on line X—X of Fig. 1;

Fig. 11 is a detail view of the cam whereby the vine-gripping jaws are automatically opened;

Fig. 12 is a plan view partially broken away of one of the grasper bars, said view also showing the gripping jaws mounted thereon, one jaw being open and the other closed;

Fig. 13 is a cross section taken on line XIII—XIII of Fig. 12;

Fig. 14 is a side view of a portion of one of the grasper bars, said view showing the plate upon which the gripping jaws are mounted;

Figure 3:
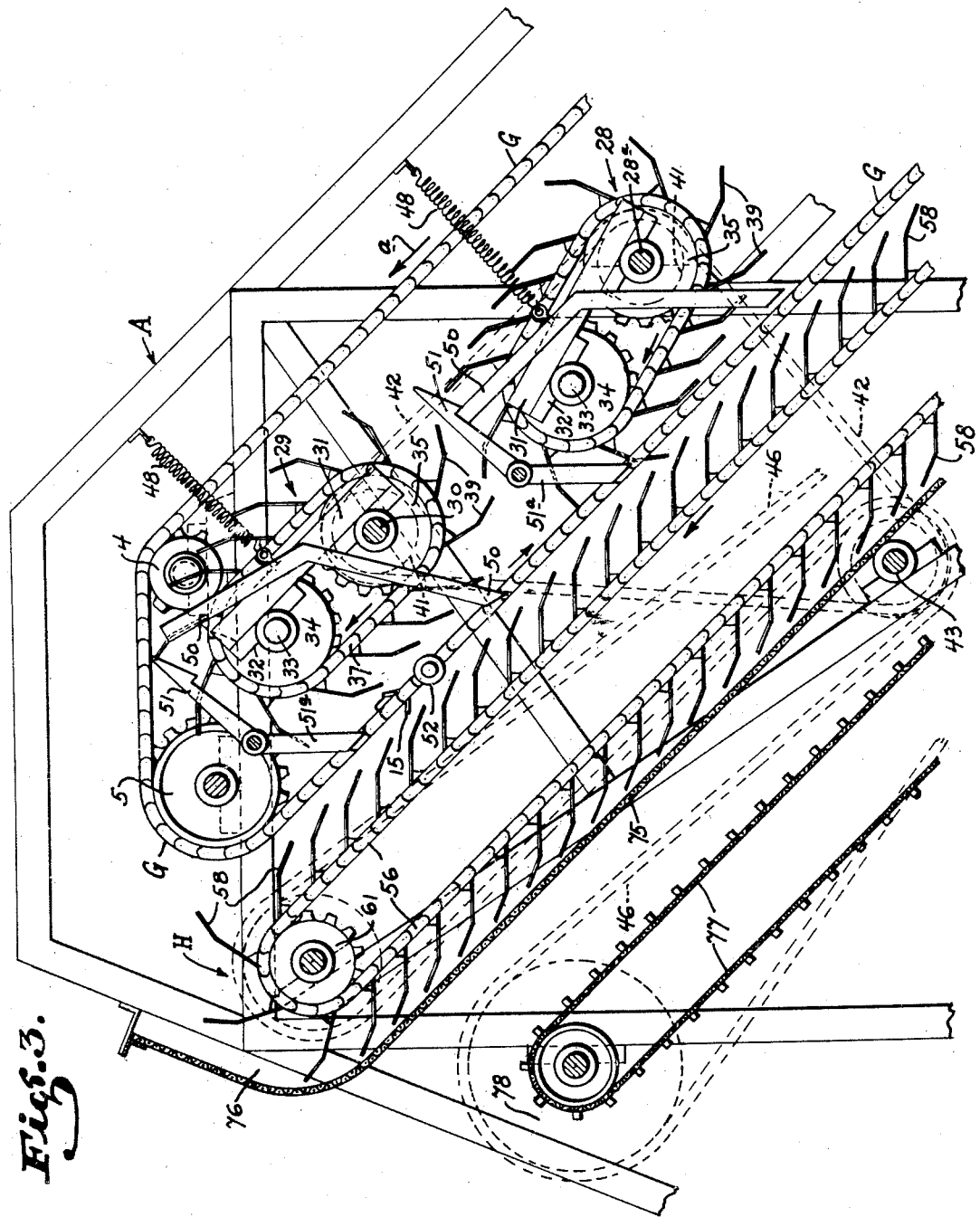
Fig. 3 is an enlarged view in side elevation of the upper portion of the picking mechanism.

Fig. 15 is a partial plan view of Fig. 5, said view showing one of the bars 57 upon which the fingers 58 are secured, and said view also showing one of the channel bars 59.

Referring to the drawings in detail, and particularly to Figs. 1 to 6, inclusive, A indicates a main frame which may be supported upon wheels or any other suitable portable unit which is adapted to be drawn by a tractor or like vehicle. Mounted on the frame is a hop-picking unit generally indicated at B, and similarly mounted thereon are a series of separating units generally indicated at C, D, E and F, whereby leaves, stems, and other foreign material is removed from the picked hops.

In conjunction with the picking unit is an endless conveyor consisting of two spaced parallel chains G—G, whereby the hop vines to be picked are pulled or conveyed through the picking unit. The chains are supported by pairs of sprocket gears indicated at 2, 3, 4, 5, 6, 7, 8 and 9, the sprockets being secured on shafts journaled crosswise of the frame, and the sprockets 7 being the driving sprockets, as the shaft 7a upon which they are secured is driven from a countershaft 10 by means of a chain and sprocket drive indicated by dotted lines at 11, the countershaft being in turn driven from a motor 12 by a chain and sprocket drive indicated by dotted lines at 14. The chains G—G are connected by angle iron grasper bars 15, spaced apart the approximate length of the vine, that is, from twelve to fifteen feet. Each bar carries a pair of gripping jaws (see Figs. 11 to 14 inclusive), one of which is stationary, as shown at 16, while the other is pivoted as at 17. A plate 18 secured to the angle bar forms a support for the jaws; this plate carries a lug 19 through which extends a rod 20, the opposite end of which is pivotally attached to a crank forming a part of the pivoted jaw. A spring 21 surrounds the rod and is interposed between the crank and the lug 19, and it exerts sufficient pressure to retain the pivoted jaw either in a closed or an open position, as shown in Figs. 11 and 12. There are two sets of clamping jaws on each grasper bar 15, one set adjacent each end thereof, and the vines to be picked are grasped thereby and are pulled through the picking unit. Two operators stand on a platform 23, each of whom grasps a vine at the butt end and bends it into a loop and passes the loop over the stationary jaw, as indicated by dotted lines at 24 (see Fig. 11), and then pulls the lever 25 to close the pivoted jaw. In this position the vine cannot be released, as the greater the pull on the vine the firmer the jaws will grip it. The vines are attached to the grasper bars 15 as they pass between the sprockets 2 and 3, this being the most convenient as it is within easy reach of the feeders or operators standing on the platform 23. The vines when attached will be pulled upwardly over the picking unit in the direction of arrow a (see Fig. 1), and thus are dragged over a series of grilling units generally indicated at 26, 27, 28 and 29. These units are identical in construction and operation, so that the description of one will suffice.

Referring to Figs. 3, 7 and 9, 30 indicates a shaft journaled crosswise of the main frame. Pivotally mounted on the shaft, adjacent each end thereof, are a pair of arms 31, and supported at the opposite end of each arm are bearings 32 in which is journaled a cross-shaft 33. Secured on said shaft are a pair of sprocket gears 34, and similarly secured on the shaft 30 are a pair of sprocket gears 35. Endless chains 37 are carried by the sprockets, and these in turn are connected by angle iron bars such as indicated at 38. Each bar carries a series of V-shaped flexible wire picking fingers 39, which are best shown in Figs. 2 and 9. The bars 38 are spaced apart as clearly shown in Figs. 7 and 9, and to prevent hops from dropping downwardly between the bars as they are removed from the hop vines, filler bars 40 are placed between the bars 38. Each of the units 26, 27, 28 and 29 has a drive shaft; the shaft 30 being the drive shaft of the unit 29, the shaft 28a being the drive shaft of the unit 28, the shaft 27a the drive for the unit 27, and the shaft 26a the drive for the unit 26. Sprocket gears such as shown at 41 in Fig. 7 are mounted on one end of each drive shaft, the sprockets 41 on the shafts 30 and 28a being driven by a chain 42 passing around a sprocket secured on a counter-shaft 43, and the drive shafts 26a and 27a being driven by a chain 44 passing over a sprocket secured on a counter-shaft 45. The shafts 43 and 45 are driven by a chain 46 which in turn is driven from the main counter-shaft 10.

The grilling units normally assume the position shown at 26, 27 and 28 when the machine is in operation, but they are raised by means of springs 48 to the position shown by the unit 29 when a grasper bar passes beneath the same. Means must accordingly be provided for raising and lowering the grilling units and for securing them in the lowered position. This is accomplished by securing a cam arm 50 to each unit. The upper end of each cam arm is adapted to be engaged by a pivoted latch 51, while the lower end of each cam arm is adapted to be engaged by a roller 52 carried by the chain G in a position slightly in advance of a grasper bar, as clearly shown in Fig. 3. The latch is also provided with an extension as shown at 51a, and this is engaged by the roller. As a grasper bar passes around the sprockets 5, the roller 52 in advance thereof will engage the lower end of the latch arm 51, thereby swinging the latch about its pivot, and causes it to release the cam arm 51. The spring 48 immediately raises the grilling unit to the position shown at 29 in Figs. 1 and 3, and thereby provides a clearance space for the free passage of the grasper bar. As the grasper bar and the roller 52 advance, the roller will engage the lower end of the arm 50 and will thus swing the grilling unit about the shaft 30 back to the position shown at 28, where the upper end of the arm is engaged by the latch and there secured. In other words, each grilling unit is merely raised during the passage of the grasper bar, and is immediately lowered into picking position after the grasper bar has cleared the same, the operation of raising and lowering being entirely automatic and being controlled by the roller 52.

The vines attached to a gasper bar, at a point between the sprockets 2 and 3, are as previously stated pulled upwardly over the grilling units in the direction of the arrow a, and as the vines full of hops are dragged over the units 26, 27, 28 and 29, the V-shaped fingers, traveling in the direction of the arrows, will comb the lower side of the vine and will remove a great portion of the hops on that side of the vine.

The upper side of the vine will not be combed, to any material degree, but it is combed when passing below the grilling units by means of an endless picker belt generally indicated at H. This belt consists of a pair of spaced chains 56 connected by angle iron cross bars such as shown at 57 (see Fig. 5). Each of these bars is provided with flexible V-shaped wire fingers 58 of the type shown in Figs. 2 and 15, and the spaces between the bars are closed by channel bars 59 also secured between the chains. This endless picker belt is supported by pairs of sprockets 60 and 61, the upper set of sprockets being driven by the chain 46, previously referred to, in the direction of the arrow (see Fig. 1). Thus as the conveyor to which the vine is attached passes around the sprockets 5 and downwardly towards the sprockets 6, it will be pulled between picking fingers 58 and the fingers mounted on the grilling units 26, 27, 28 and 29. Both sides of the vine will thus be thoroughly combed, and the picking operation is completed when the vine passes over the sprockets 6. At this point the conveyor is directed downwardly under the sprockets 7 and then down to the sprockets 8.

Just rearwardly of the sprockets 8 is a pair of rubber-covered rollers 62 and 63 (see Figs. 1, 4, 6 and 8). These rollers are provided for the purpose of pulling the vine out of the picking unit after the grasper bar passes around the sprockets 8. In order to permit the grasper bar to pass between the rollers 62 and 63, it is obviously necessary to separate them. This is automatically accomplished in the present instance as follows: Referring to Figs. 4, 6 and 8, it will be noted that the roller 62 is supported between stationary bearings 62a, while the roller 63 is mounted in arms 64 pivoted on the shaft 8a. There are two arms, one at each end of the shaft 8a, and each arm is provided with cam-shaped shoes 65. These shoes are engaged by the rollers 52 set in advance of the grasper bars, and as the rollers 52 engage the shoes, the arms 64 are raised to assume the position shown in Fig. 6, thereby separating the rollers 62 and 63 sufficiently to permit a grasper bar to pass between them. To prevent the sudden release and return of the roller 63 to its normal pulling position, extension arms 64a are provided which are connected through links 66 with a pair of lower cam arms 67 pivoted as at 68. The rollers 52 engage the lower cam arms at the same time they leave the upper cams 65, but as the rollers pass around the sprockets 8 they gradually move away from the lower shoes and thereby cause a gradual lowering of the arms 64 or a gradual movement of the roller 63 towards the roller 62. This gradual movement is desired because the rollers 62 and 63 are rubber-covered and are fairly heavy, and unless the roller 63 were gradually lowered, there would be considerable shock and impact if the shoes 65 were suddenly released.

After the rollers 52 and the grasper bar following the same have passed around the sprockets 8, they will move upwardly and over the sprockets 9, and as they approach the sprocket 2 a cam such as shown at 70 will be approached. There are two of these cams, one adjacent each end of the grasper bar. The grasper bars are slotted as shown at 71, and this permits the cams 70 to pass through the slots and to pass between the gripping jaws 16 and 17, thereby opening them and automatically releasing the butt end of the vines. The butt ends thus released will fall downwardly towards the ground. It is for this reason that the rollers 62 and 63 are provided; that is, the moment the butt ends of the vines are released, all pull is released, and the vines would be pulled back into the picking unit, but this cannot happen in the present instance, as the rollers 63 which are power-driven continue the pull and will remain in engagement until the vines have been completely discharged, when they will again be separated to permit the next grasper bar to pass.

The hops which grow on hop vines grow both singly, doubly, and in clusters, and when the vines are combed by the V-shaped picking fingers, many clusters are torn free, and so are some of the arms of the vines. These clusters should be separated into individual hops, so as to get rid of the stems that connect them. For this purpose a diamond-mesh wire screen sufficiently coarse to permit individual hops to drop through is placed below the main picker belt, as indicated at 75. Substantially all the hops, torn-off arms, and clusters that are removed from the vines are deposited at the upper end 76 of the diamond-mesh screen, and as the picking fingers practically rub against the surface of said screen, it is obvious that any clusters deposited at the upper end thereof will be torn to pieces, and the hops will be removed from the arms, before the lower end of the screen is reached. Thus substantially all the hops, whether in clusters or otherwise, will be separated and will pass through the screen and will be removed by a conveyor belt 77 which discharges them at the point indicated at 78.

In picking hops, whether by machine or by hand, it is essential that breaking of the individual hops be reduced to a minimum. Hence it is desirable that when the hops are picked or removed from the vines, they be held in a position where they are not subject to injury. The hops that are first picked are picked by the upper series of fingers of the grilling belts, indicated at 26, 27, 28 and 29. The fingers on these belts are, as previously stated, secured to angle iron bars extending crosswise of the chains supporting them, and filler bars are disposed between the angle bars, as clearly shown in Fig. 9. Thus the hops when removed from the vines by means of the fingers will settle at the base of the fingers 39 and rest upon the filler bars 40 disposed between the finger bars. They are, however, removed from this position of rest when the bars pass around the lowermost sprockets, as they drop out from between the fingers by gravity, and thus fall on top of the fingers 58 of the main picker belt. They here settle between the fingers on the filler bars 59 (see Fig. 5) and they are carried upwardly by the fingers on the filler bars and are finally dumped on the diamond-mesh wire screen at the point indicated at 76, and at this point they drop through the meshes of the screen onto the conveyor 77. Thus the hops, when actually picked or removed from the vines, are maintained in a position where they are least subject to damage, until they are delivered to the separating units which will hereinafter be described.

In the picking of the hops, that is, by combing the vines by means of the V-shaped fingers, a great many leaves, stems, arms, etc., are removed from the vines. Small leaves and stems will pass through the diamond-mesh screen and will be deposited with the hops on the conveyor 77, but large leaves, long stems and arms will slide downwardly over the diamond-mesh screen and will be delivered by a perforated plate 79 to the rubber rollers 63 which will remove them and permit them to drop to the ground. Any hops which are carried this far will pass through the perforations in the plate 79 and will be deposited on the conveyor 77.

The hops, a certain proportion of leaves, and small stems will, as previously stated, be carried upwardly by the conveyor belt 77, and are discharged at the upper end thereof, or at the point 78, and will there drop by gravity onto a series of closely spaced wire fingers 80. The leaves and hops will slide down over these fingers and will finally be deposited on a separating belt indicated at 81, while the smaller stems and leaves that happen to fall edgewise between the fingers 80 will be deposited on a conveyor belt 82 which discharges them to one side or the other of the machine. The belt 81 is made of a comparatively fine wire mesh and is supported by pulleys indicated at 83, 84 and 85. A suction fan 86 is disposed behind the belt as shown, and draws air therethrough in the direction of the arrow c. All leaves will adhere to the belt and will be carried over the roller 83, while the hops will merely roll down the belt and will be deposited on a second separator, the belt of which is indicated at 87. A certain proportion of the stems will also roll down the separating belt 81 and these will be removed as will hereinafter be described.

The leaves adhering to the belt 81 and passing over the pulley 83 will be blown off the belt as it passes around the pulley 84, as the blast of the fan 86 will blow them off. The belt 87 consists of a series of buckets 88 which are sufficiently deep to receive hops two or three layers deep. Any stems that fall in the buckets together with the hops have a tendency to stand on end and project above the surface of the buckets, and as the conveyor consisting of buckets moves in the direction of the arrows (see Fig. 1) they will pass under a revolving brush 89 which will engage the stems and discharge them onto a chute 90. The hops themselves will discharge at a point below the plate 90 into the chute 91, and from there will be discharged onto a conveyor belt 92 extending crosswise of the machine. The opposite end of this belt discharges the hops into a duct 93 (see Fig. 10), through which is maintained an upward blast of air, delivered by a fan 94 which is driven by the motor 12, the blast being sufficiently strong to lift the hops to a goose-neck 95, from where they drop by gravity into a spout 96 where the hops are sacked. Any foreign material mixed with the hops, such as clods of dirt, pieces of wire fingers that may have been broken, bolts, nuts, or the like, which may have fallen into the machinery, or which have shaken loose, will all drop downwardly through the duct 93, and discharge at the lower end thereof, at the point indicated at 97. Thus, nothing but clean hops is delivered to the sacking spout 96, as all other foreign material, such as leaves, stems, arms, etc., has been removed.

The present invention relates to the picking mechanism only. It is for this reason that only a brief description of the several separating machines employed has been given, as the separating machines are fully illustrated and described in the following two issued patents: No. 2,138,529, issued November 29, 1938, entitled "Hop separator"; and No. 2,116,006, issued May 3, 1938, for "Hop and stem separator".

In actual operation, it will be understood that the unit shown in Fig. 1 will be mounted on wheels, not shown, or any other portable unit, such as a trailer or the like, and that the unit will be drawn by a tractor. The tractor will pull the unit down through a hop field between the rows of hops. The pickers will cut down the vines on opposite sides of the tractor, and they will be handed butt end to the operators or feeders standing on the platform 23. These feeders will attach the butt ends of the vines to the clamps of the grasper bars as they pass between the sprockets 2 and 3. Thereafter further attention on the part of the operators is unnecessary, as all picking and separating operations are automatically taken care of by the machinery.

The picking unit may stand stationary while the vines are being cut and delivered to the feeders, or it may be slowly advancing as the vines are being cut and delivered to the feeders.

The vines themselves are automatically released by the cams 70 when they have been picked, and whatever remains of the vine when the butt ends are released by the cam 70 is pulled out from between the picking fingers by means of the power-driven rollers 62 and 63. These rollers also automatically discharge any large stems and arms which may have been torn free from the vines during their passage through the picking mechanism. All such matter is deposited directly on the ground and is uniformly spread as the machine advances. A certain proportion of smaller stems, leaves and petals are separated by the fingers 80 and are discharged to one side by the conveyor belt 82. The rest of the leaves are separated or removed from the hops by the belt 81, and are discharged to the ground at the rear of the machine, while any heavy objects, such as clods of dirt, broken parts of wire fingers or other metal objects, are discharged to the ground through the lower end of the duct 97.

The separating belt consisting of the buckets 88 is supported by the sprockets shown in Fig. 1, and one of the sprockets forms a driving sprocket and is driven by a chain from one of the countershafts. The upper pulley 83 of the separating belt 81 is driven by a chain indicated in dotted lines from the upper conveyor belt shaft. The fan 86 is driven from the motor 12, through a belt which drives a pair of spiral gears 98; this in turn drives a shaft 99 which, through a belt, drives the fan 86. The entire mechanism is thus driven by the motor 12, which may be a gas engine or any motive power unit of a similar nature.

While certain features of the invention have been more or less specifically described and illustrated, I nevertheless wish it understood that changes may be resorted to, within the scope of the appended claims, and that the materials and finish of the several parts employed may be such as the experience and judgment of the manufacturer may dictate.

Having thus described my invention, what I claim and desire to secure by Letters Patent is as follows:

1. In a hop picking machine, a main picker belt composed of transverse rows of V-shaped picking fingers, a second picker belt composed of transverse rows of V-shaped picking fingers disposed above the main picking belt, means for imparting continuous movement to both picker belts, with their adjacent surfaces traveling in the same direction, said second belt being disposed on an angle with relation to the main belt and having one end movable to and from the main belt; a vine conveyor movable between the two belts, grasper bars on the vine conveyor, to which vines to be picked are attached; and means actuated by movement of the vine conveyor for automatically raising and lowering the movable end of the second belt during the passage of a grasper bar therebeneath, said means comprising a spring for raising the movable end, a latch arm normally securing the movable end in the lower position, a roller on the belt engageable with the latch to release it and to permit the spring to raise the movable end, and a cam on the movable end which the roller engages to lower the movable end into engagement with the latch.

2. In a hop picking machine of the character described, a main frame, a main picking belt mounted therein, a drive shaft journaled crosswise of the frame, a pair of arms pivoted at one end to said shaft and spaced apart, a picker mechanism consisting of transverse rows of V-shaped fingers driven by the drive shaft and supported by the arms and between them, said picking mechanism being disposed above the main picking belt; an endless chain conveyor passing over the picking mechanism and between the same and the main picking belt, vine-grasper means on the bars to receive and secure the butt ends of the vines to be picked, said conveyor together with the bars and grasper means pulling the vines over the picking mechanism and between the same and the main picking belt; spring means connected with the free ends of the arms which support the picking mechanism, to lift the picking mechanism away from the main picking belt; a latch normally holding the picking mechanism in picking position; means actuated by the chain conveyor during the passage of a grasper bar for automatically releasing the latch to permit the picking mechanism to raise while a grasper bar passes under the same, and other means actuated by the chain conveyor for lowering the picking mechanism back into engagement with the latch.

3. In a hop picking machine of the character described a picking mechanism having an intake and a discharge end, an endless conveyor, manually actuated clamping means on the conveyor operable at a feeding position for receiving and securing the butt end of a vine to be picked, said conveyor and clamping means pulling the vine through the picking mechanism; a pair of rubber-covered rollers disposed at the discharge end of the picking mechanism; means for automatically and momentarily separating the rollers to permit passage of the clamping means between them; and other means for automatically opening the clamping means to release the butt end of the vine after passing between the rollers, said rollers pulling the remainder of the vine out of the picking mechanism after the butt end is released.

4. In a hop picking machine, a main picker belt composed of transverse rows of V-shaped picking fingers, a second picker belt composed of transverse rows of V-shaped picking fingers disposed above the main picking belt, means for imparting continuous movement to both picker belts, with their adjacent surfaces traveling in the same direction, means for feeding a hop vine between the belts and in a direction opposite to the movement of the adjacent surfaces of the belts, a wire mesh screen disposed below the main picker belt to receive individual hops, clusters of hops and arms torn from the vines, said screen being in such close proximity to the picking fingers of the main belt that clusters of hops will be broken, and hops will be removed from the arms, said screen being sufficiently coarse to permit individual hops to drop through, but retaining the arms, and said arms being dragged by the fingers of the picking belt to a point of discharge; a perforated plate forming a continuation of the screen at the point of discharge; and a pair of continuously revolving rollers disposed adjacent said plate to remove the arms deposited thereon.

EDOUARD THYS.